United States Patent
Nerieri

(10) Patent No.: US 8,984,078 B2
(45) Date of Patent: Mar. 17, 2015

(54) SYSTEMS AND METHODS FOR DEVICE-TO-CLOUD MESSAGE DELIVERY

(71) Applicant: Francesco Nerieri, Santa Cruz, CA (US)

(72) Inventor: Francesco Nerieri, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 37 days.

(21) Appl. No.: 13/751,482

(22) Filed: Jan. 28, 2013

(65) Prior Publication Data

US 2014/0201317 A1     Jul. 17, 2014

Related U.S. Application Data

(60) Provisional application No. 61/751,515, filed on Jan. 11, 2013.

(51) Int. Cl.
*G06F 15/16* (2006.01)
*H04L 29/08* (2006.01)
*G06F 9/54* (2006.01)

(52) U.S. Cl.
CPC .............. *H04L 67/10* (2013.01); *G06F 9/546* (2013.01); *G06F 2209/547* (2013.01)
USPC ....................................................... 709/206

(58) Field of Classification Search
CPC ........................... G06Q 10/107; H04L 12/585
USPC .......................................................... 709/206
See application file for complete search history.

(56) References Cited

U.S. PATENT DOCUMENTS

| | | |
|---|---|---|
| 2002/0116435 A1 | 8/2002 | Chen et al. |
| 2007/0071021 A1 | 3/2007 | Girao |
| 2007/0234369 A1 | 10/2007 | Paramisivam et al. |
| 2009/0292766 A1 * | 11/2009 | Morris .......................... 709/203 |
| 2012/0079045 A1 | 3/2012 | Plotkin |
| 2012/0331087 A1 * | 12/2012 | Luna et al. .................... 709/213 |
| 2013/0014122 A1 * | 1/2013 | Nord et al. .................... 718/104 |
| 2013/0110956 A1 * | 5/2013 | Barman et al. ................ 709/206 |

OTHER PUBLICATIONS

PCT/US2014/011090 International Search Report and Written Opinion, Mailed May 30, 2014.

* cited by examiner

*Primary Examiner* — Bryan Lee
(74) *Attorney, Agent, or Firm* — Troutman Sanders LLP; James E. Schutz; Christopher W. Glass

(57) ABSTRACT

Certain implementations of the disclosed technology may include systems, methods, and computer-readable media for providing device-to-cloud (upstream) message delivery. According to an example implementation, a method is provided that can include generating, by a mobile computing device, a first message from a first application and a second message from a second application. The method includes establishing a communication connection between the mobile computing device and a remote device, packaging the second message with the first message for sending from the mobile computing device to the remote device; and sending, from the mobile computing device to the remote device, and by the established communications connection, the packaged first message and second message.

17 Claims, 4 Drawing Sheets

SYSTEMS AND METHODS FOR DEVICE-TO-CLOUD MESSAGE DELIVERY

This application is related to provisional application Ser. No. 61/751,515, filed on Jan. 11, 2013, entitled: "Systems and Methods for Device-to-Cloud Message Delivery," the contents of which are hereby incorporated by reference in their entirety.

BACKGROUND

Certain mobile applications that are utilized in mobile computing environments are designed to provide communications with remote servers (sometimes referred to as servers on the "cloud"). For example, when applications and services on a mobile device prepare to deliver data to a server on the cloud, a connection to the server is opened, and the connection is often encrypted. For example, communication protocols such as HTTPS, TCP, SSL, etc., can be used for secure communications between the mobile device and servers on the cloud. The process of opening, encrypting, sending, and closing multiple, uncoordinated messages from the mobile device to the server can require extra overhead, increase latency, cause excess battery drain on the mobile device, and unnecessarily consume data.

SUMMARY

Some or all of the above needs may be addressed by certain implementations of the disclosed technology. Certain implementations may include systems, methods, and computer-readable media for providing device-to-cloud (upstream) message delivery.

According to an example implementation, a method is provided for generating, by a mobile computing device, a first message from a first application and generating, by the mobile computing device, a second message from a second application. The method includes establishing a communication connection between the mobile computing device and a remote device for sending one or more messages from the mobile computing device to the remote device. The method includes packaging, by the mobile computing device, the second message with the first message for sending from the mobile computing device to the remote device, and sending, from the mobile computing device to the remote device, and by the established communications connection, the packaged first message and second message.

According to another example implementation, a system is provided. The system includes at least one memory for storing data and computer-executable instructions and at least one processor configured to access the at least one memory and further configured to execute the computer-executable instructions to cause the system to generate a first message from a first application, generate a second message from a second application, establish a communication connection between the system and a remote device for sending one or more messages to the remote device, package the second message with the first message; and send, to the remote device, and by the established communications connection, the packaged first message and second message.

According to another example implementation, a computer-readable storage medium is provided. The computer-readable storage medium stores instructions executable by one or more processors to perform a method that includes generating, by a mobile computing device, a first message from a first application and generating, by the mobile computing device, a second message from a second application. The method includes establishing a communication connection between the mobile computing device and a remote device for sending one or more messages from the mobile computing device to the remote device. The method includes packaging, by the mobile computing device, the second message with the first message for sending from the mobile computing device to the remote device, and sending, from the mobile computing device to the remote device, and by the established communications connection, the packaged first message and second message.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:\

DETAILED DESCRIPTION

Figure 1:
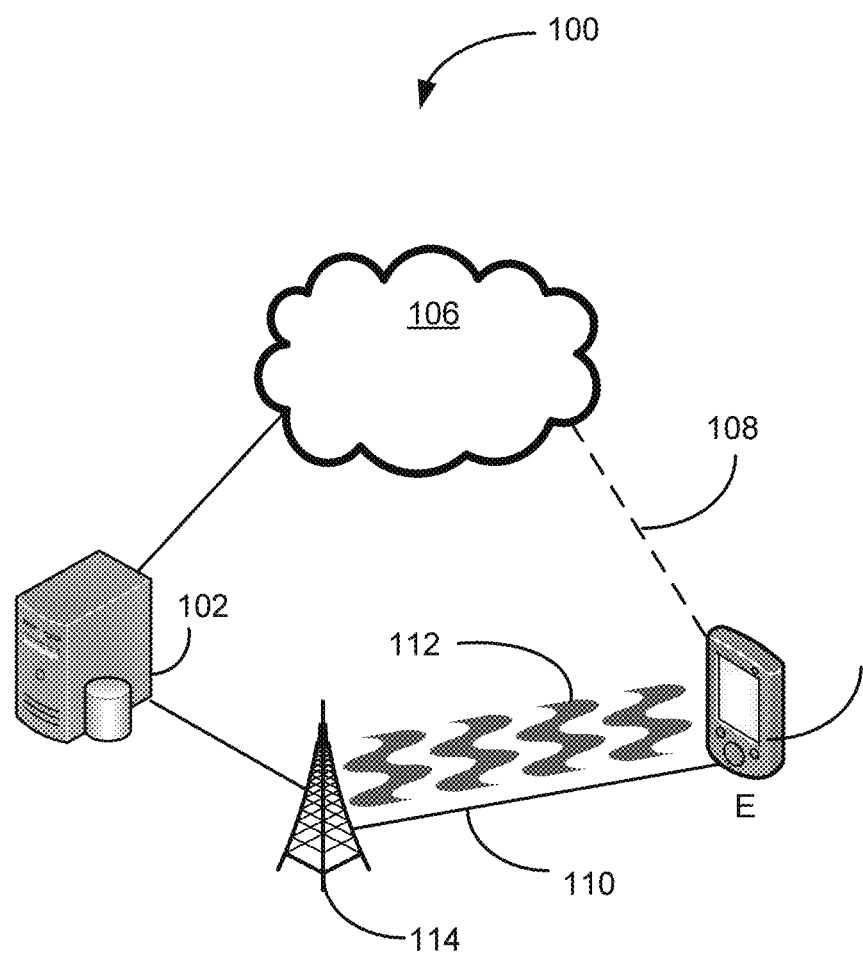
FIG. 1 is a block diagram of an illustrative mobile communications system 100 according to an implementation of the disclosed technology.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology allow applications, services, and user profiles on a mobile computing device to utilize already established communication connections to coordinate, package together, and deliver messages upstream from the device to the cloud. In one implementation, the messages may be routed to another device or to a specific server in the cloud. For example, in one implementation, messages may be packaged at the mobile computing device and routed to a 3rd party server that may be controlled by an owner of the application or service that is associated with the messages that are being sent upstream.

According to an example implementation, by utilizing the already established connection and packaging multiple messages together, the delivery of messages between two devices (from a smartphone to a server, for example) may result in a reduced amount of data overhead. In some implementations, by reducing the overhead involved in establishing a secure connection between two devices, latency and data usage may be reduced. For example, a new connection may be established for sending a push notification from device A to device B. Establishing such a communications connection may involve time to setup a secure connection from device A to a server in the cloud S (which may involve encryption), plus the time needed by the server S to establish a connection and deliver a message to the push notification service, plus the time to deliver the message from the push notification service to the second device B.

For messages that do not have strict low latency requirements, utilizing the upstream connection for delivery of multiple messages at a time may improve battery life. For example, according to an example implementation, messages could be held so they could be batched together, and/or delivered when one or more additional messages are ready.

Certain implementations of the disclosed technology provide for packaging multiple electronic data messages on a mobile device for joint transmission to a server or remote device. In one example implementation, the messages may be generated by two or more applications that are running on a mobile computing device. In another example implementation, the messages may be generated by two or more instances of an application running on the mobile computing device.

Certain embodiments of the disclosed technology may address the problem of holding messages on a mobile computing device while the mobile computing device is in a low power (or dormant) state. Implementations may utilize information about the state of the mobile device's communication radio to determine when to send the messages to the remote server. Implementations may utilize a low-power communications connection between the server and the mobile computing device to notify the server of the mobile computing device's radio status, and/or to notify the mobile computing device of an established connection. Implementations may notify the server when the device's radio has been turned on (or placed in an active state) so that messages held on the mobile computing device may be delivered upstream to the server.

According to implementations, the low-power communications connection referred to above may be a persistent connection that is akin to a periodic ping or heartbeat signal that allows the mobile device to return to a lower power listening state between pings. According to implementations, a mobile connection service (MCS) may provide the low-power or persistent communications connection for communicating the device's radio state to the server and/or for notifying the mobile communication device of an established connection or state of the connection. Those skilled in the art will recognize the MCS may be utilized to request radio resources from the mobile computing device, and/or the MCS may be utilized to communicate the device's radio status to the server. For example, if no packets are being sent or received, the mobile device (or the server) may send a heartbeat ping packet to tell the other end that the connection is still alive. For example, pings may be exchanged every minute or at some other predetermined periodic interval. For example, in one implementation, the pings may be exchanged ever 28 minutes. According to implementations, the mobile communications device may use the knowledge obtained from this method to send information to the server, and vice-versa.

Implementations of the disclosed technology enable conservation of computing and battery resources, at least in part, because the mobile device's radio does not necessarily need to wake up to send every new message separately to the server. According to an implementation, low priority push messages may be held on the mobile computing device, for example, until a predetermined time has elapsed. In an implementation, when the device's radio has been turned on, messages that were previously held may be packaged together sent to the server. Embodiments of this disclosed technology may help optimize sending push messages from the mobile computing device to the server. Embodiments of the disclosed technology may also help extend mobile computing device's battery charge by holding messages until the device's radio has been turned on for other reasons.

According to an example implementation of the disclosed technology, the mobile computing device may generate multiple messages, some of which may be associated with different applications, and may be destined to different end devices. In one example implementation, all or a portion of such messages may be packaged together to utilize the already established upstream connection to the server, and the server may then parse the packaged messages according to their final destination.

In accordance with certain implementations, the mobile device may default to a low-power listening mode when it is not active to enable the reception of SMS messages or phone calls. According to an implementation, after messaging, phone calls, or other communications requiring the radio has completed, and if there is no further traffic, the radio on the mobile device can switch from high power mode to low power mode, or to a listen mode. If at any point in time, the mobile device needs to send a message to the server, the mobile device may assemble and package any waiting messages, power-up (or wake-up) the radio, and deliver the messages to the server. In accordance with an implementation, the mobile device may obtain a socket of the persistent connection and monitor the connection via the socket.

According to implementations, the mobile device radio may be in different states of operation, depending on the situation. For example, when sending information or uploading data to the server or cellular network, the mobile device radio may be in a high-powered or active communication mode. During certain periods, the mobile device may be in a low-power or listen mode only. The radio may be off when the mobile device is completely powered off.

Various implementation of the disclosed technology may be utilized for efficient device-to-cloud messaging communications, according to example implementations of the disclosed technology, and will now be described with reference to the accompanying figures.

FIG. 1 is a block diagram of an illustrative mobile communications system 100 according to an example embodiment of the disclosed technology. The system 100 may include a mobile computing device 104 with architecture, associated memory storage, peripherals, etc. that will be subsequently discussed with reference to FIG. 3. Those skilled in the art recognize that there are several categories of mobile computing devices 104, generally known as portable computing devices that can run on batteries but are not usually classified as laptops. For example, mobile computing devices 104 can include, but are not limited to portable computers, tablet PCs, Internet tablets, PDAs, ultra mobile PCs (UMPCs) and smart phones.

The system may also include a server 102 configured for communication with the mobile computing device 104. In an example implementation, mobile computing device 104 may communication with the server 102 through a Wi-Fi™ channel or some other Internet connection 108, for example, and may utilize cloud services or the Internet 106 for communication between the mobile device 104 and the server 102. According to an implementation, the mobile device 104 may communicate with the server 102 through a service provider 114. For example, the service provider 114 may provide cellular service through cellular radio channels 112 for communicating with the mobile device 104. According to an implementation, the service provider 114 may also communicate with the mobile computing device 104 through the MCS persistent connection 110. According to implementations of the disclosed technology, the mobile computing device 104 communicate or send messages to the server 102 through the service provider 114.

According to implementations, there may be situations where the mobile device is not in range of a Wi-Fi™ channel or other Internet connection 108, and any information communications with the server may then be accomplished via the service provider 114. However, in situations where the mobile device 104 has an Internet connection 108, the mobile device 104 may communicate with the server 102 (for at least a certain class of signals and messages) via the cloud or internet 106 without needing to utilize the service provider 114.

Figure 2:
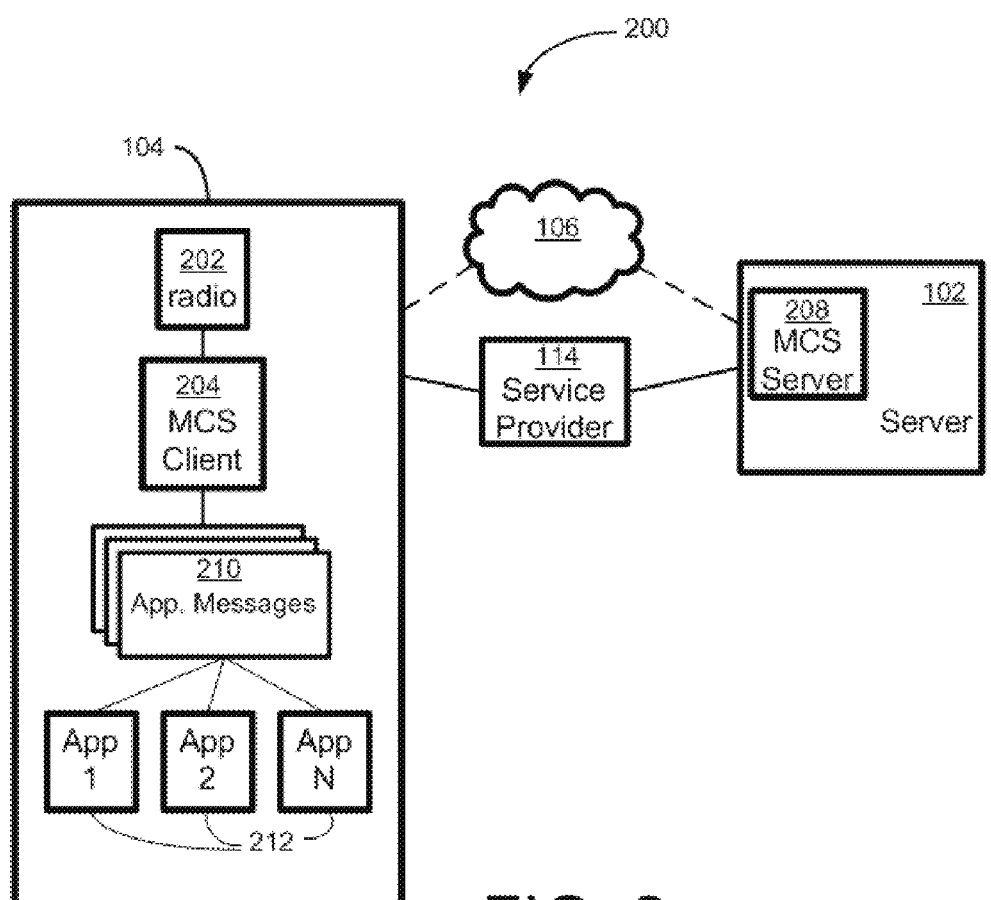
FIG. 2 is an illustrative block diagram of a messaging system 200 according to an implementation of the disclosed technology.

FIG. 2 is an illustrative block diagram of an upstream messaging system 200 according to an implementation of the disclosed technology. In one embodiment, one or more applications 212 residing on (or associated with) the mobile computing device 104 may generate a plurality of application messages 210. For example, a first application may generate a push message for sending to another mobile device, the second application may generate a push message intended for a particular remote server, and a third application may be a second instance of the first application and may generated another push message for sending to another mobile device.

The application messages 210 may be generated at different times, but may be grouped or packaged together for sending to the server 102. In certain example implementations, an MCS client 204 on the mobile computing device may be utilized to package the application messages 210 and send them to the MCS Server 208 via the radio 202 on the mobile computing device 104. In one example embodiment, the communication channel may utilize a service provided 114 (such as a cellular network provider), and the messages may be delivered from the mobile computing device 104 to the server 102 via the service provider 114. In another example embodiment, the communication channel may utilize the cloud or Internet 106, for example, by an available Wi-Fi network, and the messages may be delivered from the mobile computing device 104 to the server 102 via the Internet 106.

As previously discussed, the application messages 210 may include push messages, SMS messages, application specific messages, etc., for sending to a server and/or one or more additional mobile computing devices (not shown). According to one example implementation the application messages 210 may be generated on the mobile device through different user profiles or accounts, for example, so multiple people may share the same device.

The application messages 210, for example, may include, but are not limited to, a push messages, notifications, updates, etc. In an example implementation, the messages 210 may be delivered after a given time has elapsed. In another example implementation, the messages 210 may be delivered after notification from the MCS client 204 or MCS server 208 indicate that the communication connection has been established and the radio 202 has been activated.

According to one implementation, a mobile device user may set preferences such that all such messages 210 may be delivered as soon as they arrive. According to another implementation, the messages 210 may be categorized by priority, and high-priority messages may be delivered immediately, while low-priority messages may be held until the radio 204 is active, until other messages are ready to send, or until after a predetermined period has elapsed.

Various implementations of the communication systems and methods herein may be embodied in non-transitory computer readable media for execution by a processor. An example implementation may be used in an application of a mobile computing device, such as a smartphone or tablet, but other computing devices may also be used, such as portable computers, tablet PCs, Internet tablets, PDAs, ultra mobile PCs (UMPCs), etc.

Figure 3:
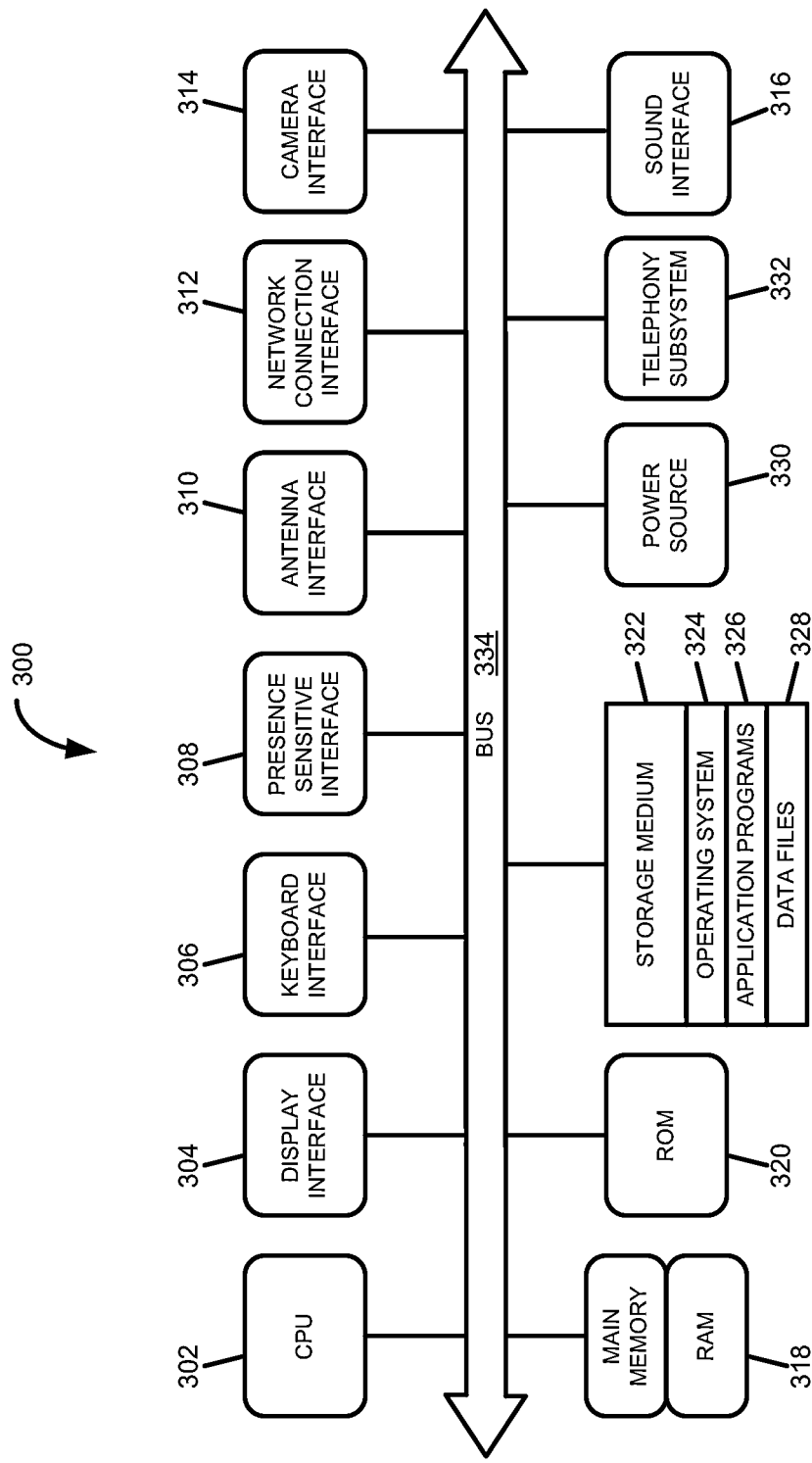
FIG. 3 is a block diagram of an illustrative computer system architecture 300 according to an implementation of the disclosed technology.

FIG. 3 depicts a block diagram of an illustrative computer system architecture 300 corresponding to a mobile device, for example, the mobile device 104 in FIGS. 1 and 2. The architecture 300 of FIG. 3 includes a central processing unit (CPU) 302, where computer instructions are processed; a display interface 304 that acts as a communication interface and provides functions for rendering video, graphics, images, and texts on the display; a keyboard interface 306 that provides a communication interface to a keyboard; and a presence sensor interface 308 that provides a communication interface to a pointing device, touch screen, or other presence sensitive detector 104. Example implementations of the architecture 300 may include an antenna interface 310 that provides a communication interface to an antenna; a network connection interface 312 that provides a communication interface to a network. In certain implementations, a camera interface 314 is provided that acts as a communication interface and provides functions for capturing digital images from a camera. According to an example implementation of the disclosed technology, the camera interface 314 may be utilized for capturing video sequences for determining gesture based input. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the architecture 300 includes a read-only memory (ROM) 320 where invariant low-level systems code or data for basic system functions such as basic input and output (I/O), startup, or reception of keystrokes from a keyboard may be stored in a non-volatile memory device. According to an example implementation, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files may include an operating system 324, application programs 326 (including, for example, a web browser application, a widget or gadget engine, MCS client, and or other applications, as necessary) and data files 328 may be stored. According to an example implementation, the architecture 300 may include a power source 330 that provides an appropriate alternating current (AC) or direct current (DC) to power components. According to an example implementation, the architecture 300 may include a telephony subsystem 332 that allows the mobile device to transmit and receive sound over a telephone network. The constituent devices and the CPU 302 may communicate with each other over a bus 334.

In accordance with example implementations, the CPU 302 has appropriate structure to be a computer processor. In one arrangement, the computer CPU 302 may be more than one processing unit. The RAM 318 may interface with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data is accessed by the computer CPU 302 during execution. In one example configuration, the architecture 300 may include at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the architecture 300 to access computer-executable process steps, application programs and the like, stored on removable and non-removable memory media, to off-load data from the architecture 300 or to upload data onto the device 300. A computer program product, such as one utilizing a communication system may be tangibly embodied in storage medium 322, which may comprise a machine-readable storage medium.

It will be understood that the architecture illustrated in FIG. 3 is provided for example purposes only and does not limit the scope of the various implementations of the communication systems and methods.

In accordance with certain example implementations, a mobile computing device, as described herein, can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s). In one implementation, the computing device may be the processor itself. In another example implementation, the computing device may be the processor and memory.

Figure 4:
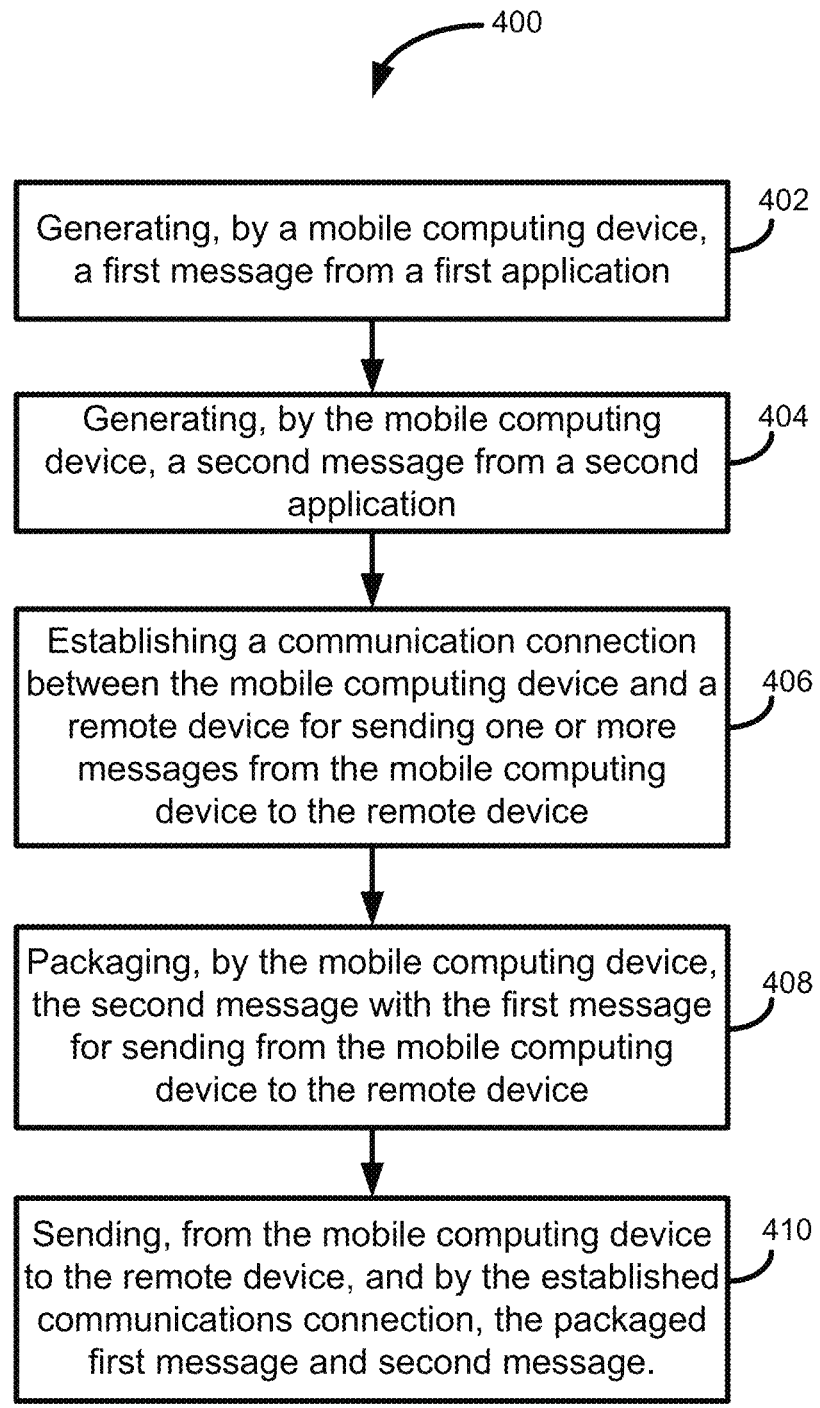
FIG. 4 is a flow diagram of an example method 400 according to an implementation of the disclosed technology.

An example method 400 will now be described with reference to the flowchart of FIG. 4. The method 400 starts in block 402, and according to an example implementation includes generating, by a mobile computing device, a first message from a first application. In block 404, the method 400 includes generating, by the mobile computing device, a second message from a second application. In block 406, the method 400 includes establishing a communication connection between the mobile computing device and a remote device for sending one or more messages from the mobile computing device to the remote device. In block 408, the method 400 includes packaging, by the mobile computing device, the second message with the first message for sending from the mobile computing device to the remote device. In block 410, the method 400 includes sending, from the mobile computing device to the remote device, and by the established communications connection, the packaged first message and second message.

According to an example implementation of the disclosed technology, packaging and sending a generated message may be delayed until either a predetermined time has elapsed or until an additional message has been generated. In this implementation, a single generated message (for example, the first message generated from the first application) may still be delivered after a predetermined period, but if subsequent messages are generated, they can be packaged and sent together with the first message.

In an example implementation, the remote device is a second mobile computing device. In another example implementation, the remote device is a server. In an example implementation, establishing the communications connection between the mobile device and remote device includes establishing a secure connection. In an example implementation, the first application is associated with a first user profile on the mobile computing device and the second application is associated with a second user profile on the mobile computing device, and the first user profile is configured to run the first application on the mobile computing device, and the second user profile is configured to run the second application on the mobile computing device.

In an example implementation, the first application and the second application are respective first and second instances of the same application. In an example implementation, establishing the communication connection includes establishing a single network connection to the remote device. In an example implementation, packaging may include multiplexing two or more messages, wherein at least one of the two or more messages is associated with a first user profile on the mobile computing device and wherein at least one of the two or more messages is associated with a second user profile on the mobile computing device.

According to example implementations, certain technical effects can be provided, such as creating certain systems and methods that provide for efficient upstream push messages from a mobile computing device to a server.

In example implementations of the disclosed technology, the mobile communications system 100 may include any number of hardware and/or software applications that are executed to facilitate any of the operations. In example implementations, one or more I/O interfaces may facilitate communication between the mobile communications system 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the mobile communications system 100. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the mobile communications system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the mobile communications system 100 with more or less of the components illustrated in FIGS. 1-3

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method comprising:
generating a first message, by a first application of a mobile computing device, the first message being associated with a first user profile, wherein the first user profile includes personal data associated with a first user;
generating a second message, by a second application of the mobile computing device, the second message being associated with a second user profile;
determining, based on the first user profile, a first priority for sending the first message;
determining, based on the second user profile, a second priority for sending the second message;
establishing a communication connection between the mobile computing device and a remote device for sending one or more messages from the mobile computing device to the remote device;
based on the first priority for sending the first message and the second priority for sending the second message:
packaging, by the mobile computing device, the second message with the first message for sending from the mobile computing device to the remote device; and
sending, from the mobile computing device to the remote device, and by the established communications connection, the packaged first message and second message.

2. The method of claim 1, wherein the remote device is a second mobile computing device.

3. The method of claim 1, wherein the remote device is a server.

4. The method of claim 1, wherein establishing the communications connection between the mobile device and remote device comprises establishing a secure connection.

5. The method of claim 1, wherein the first application and the second application are respective first and second instances of the same application.

6. The method of claim 1, wherein establishing the communication connection comprises establishing a single network connection to the remote device.

7. The method of claim 1, wherein the second message is packaged with the first message and the packaged first message and second message is sent in response to determining that the first priority and the second priority are the same.

8. A system comprising:
   at least one memory for storing data and computer-executable instructions; and
   at least one processor configured to access the at least one memory and further configured to execute the computer-executable instructions to cause the system to:
      generate a first message by a first application, the first message being associated with a first user profile, wherein the first user profile includes personal data associated with a first user;
      generate a second message by a second application, the second message being associated with a second user profile;
      determine, based on the first user profile, a first priority for sending the first message;
      determine, based on the second user profile, a second priority for sending the second message;
      establish a communication connection between the system and a remote device for sending one or more messages to the remote device;
      based on the first priority for sending the first message and the second priority for sending the second message:
         package the second message with the first message; and
         send, to the remote device, and by the established communications connection, the packaged first message and second message.

9. The system of claim 8, wherein the remote device is a mobile computing device.

10. The system of claim 8, wherein the remote device is a server.

11. The system of claim 8, wherein establishing the communications connection comprises establishing a secure connection.

12. The system of claim 8, wherein the first application and the second application are respective first and second instances of the same application.

13. The system of claim 8, wherein establishing the communication connection comprises establishing a single network connection to the remote device.

14. A non-transitory computer-readable storage medium that stores instructions executable by one or more processors to perform a method comprising:
   generating a first message, by a first application of a mobile computing device, the first message being associated with a first user profile, wherein the first user profile includes personal data associated with a first user;
   generating a second message, by a second application of the mobile computing device, the second message being associated with a second user profile;
   determining, based on the first user profile, a first priority for sending the first message;
   determining, based on the second user profile, a second priority for sending the second message;
   establishing a communication connection between the mobile computing device and a remote device for sending one or more messages from the mobile computing device to the remote device;
   based on the first priority for sending the first message and the second priority for sending the second message:
      packaging, by the mobile computing device, the second message with the first message for sending from the mobile computing device to the remote device; and
      sending, from the mobile computing device to the remote device, and by the established communications connection, the packaged first message and second message.

15. The non-transitory computer-readable medium of claim 14, wherein the remote device is a second mobile computing device.

16. The non-transitory computer-readable medium of claim 14, wherein the remote device is a server.

17. The non-transitory computer-readable medium of claim 14, wherein establishing the communications connection between the mobile device and remote device comprises establishing a secure connection.

\* \* \* \* \*